US006636590B1

(12) United States Patent
Jacob et al.

(10) Patent No.: US 6,636,590 B1
(45) Date of Patent: Oct. 21, 2003

(54) APPARATUS AND METHOD FOR SPECIFYING AND OBTAINING SERVICES THROUGH VOICE COMMANDS

(75) Inventors: Karl Jacob, San Francisco, CA (US); Scott Faber, San Francisco, CA (US); Sean Van Der Linden, San Francisco, CA (US)

(73) Assignee: Ingenio, Inc., San Francisco, CA (US)

( * ) Notice: Subject to any disclaimer, the term of this patent is extended or adjusted under 35 U.S.C. 154(b) by 200 days.

(21) Appl. No.: 09/702,217

(22) Filed: Oct. 30, 2000

(51) Int. Cl.[7] .......................... H04M 15/00; G10L 21/00
(52) U.S. Cl. ........................ 379/114.05; 379/88.17; 379/88.27; 379/265.09; 379/265.12; 704/246; 704/270; 704/275
(58) Field of Search ...................... 379/111, 114.01, 379/114.03, 114.05, 115.01, 120, 130, 201.01, 201.02, 201.05, 201.12, 67.1, 69, 88.01, 88.02, 88.03, 88.17, 88.27, 88.16, 88.18, 88.22, 265.09, 265.11, 265.12, 265.13, 308–309; 704/231, 246–247, 250, 258, 270, 275

(56) References Cited

U.S. PATENT DOCUMENTS

| 4,577,065 A | 3/1986 | Frey et al. |
| 4,631,428 A | 12/1986 | Grimes |
| 4,677,434 A | 6/1987 | Fascenda |
| 4,723,283 A | 2/1988 | Nagasawa et al. |
| 4,751,669 A | 6/1988 | Sturgis et al. |
| 4,847,890 A | 7/1989 | Solomon et al. ............ 379/67.1 |
| 5,058,152 A | 10/1991 | Solomon et al. ............ 379/67.1 |
| 5,148,474 A | 9/1992 | Haralambopoulos et al. |

(List continued on next page.)

FOREIGN PATENT DOCUMENTS

| GB | 2329046 A | 10/1999 |
| JP | 409233441 A | 9/1997 |

(List continued on next page.)

OTHER PUBLICATIONS

The Voice of Technology, Credit World, pp 20–23, Jul. 1994.
Telecommunications Buyers Guide and Directory, Editor & Publisher, pp 29TC–38TC, Feb. 1994.

(List continued on next page.)

Primary Examiner—Binh Tieu
(74) Attorney, Agent, or Firm—Blakely, Sokoloff Taylor & Zafman, LLP (57) ABSTRACT

The present invention overcomes the problems in the existing art described above by providing a method and apparatus for specifying and obtaining services through voice commands, via a voice portal, resulting in a live conversation between a user and a selected service provider. The present invention is a system through which seekers of a wide array of services can select, contact, converse, and pay for a service provider using a simple voice-transmission medium such as the telephone. The invention enables the seeker to locate a service provider by speaking the name of a profession, such as "psychiatrist," which is recognized by the system's voice-recognition software. In a similar fashion, the seeker can then specify by speaking aloud the price range, quality rating, language, and keyword descriptors of the service provider. Within the desired parameters, the system offers service providers who have made themselves available to render services at the present time. Once the appropriate available service provider is selected, the system connects the service seeker with the service provider for a live conversation. The system automatically bills the seeker for the time spent conversing with the service provider and compensates the service provider accordingly.

24 Claims, 10 Drawing Sheets

U.S. PATENT DOCUMENTS

| | | |
|---|---|---|
| 5,319,542 A | 6/1994 | King, Jr. et al. |
| 5,325,424 A | 6/1994 | Grube |
| 5,347,632 A | 9/1994 | Filepp et al. |
| 5,359,508 A | 10/1994 | Rossides |
| 5,361,295 A | 11/1994 | Solomon et al. ........... 379/67.1 |
| 5,369,694 A | 11/1994 | Bales et al. ................. 379/206 |
| 5,497,502 A | 3/1996 | Castille |
| 5,537,314 A | 7/1996 | Kanter |
| 5,539,735 A | 7/1996 | Moskowitz |
| 5,555,298 A | 9/1996 | Jonsson |
| 5,557,677 A | 9/1996 | Prytz |
| 5,574,780 A | 11/1996 | Andruska et al. |
| 5,590,197 A | 12/1996 | Chen et al. |
| 5,602,905 A | 2/1997 | Mettke |
| 5,608,786 A | 3/1997 | Gordon ...................... 379/100 |
| 5,619,148 A | 4/1997 | Sloane |
| 5,619,570 A | 4/1997 | Tsutsui |
| 5,619,725 A | 4/1997 | Gordon ...................... 395/839 |
| 5,634,012 A | 5/1997 | Stefik et al. |
| 5,638,432 A | 6/1997 | Wille et al. |
| 5,675,734 A | 10/1997 | Hair |
| 5,694,549 A | 12/1997 | Carlin et al. |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,734,961 A | 3/1998 | Castille |
| 5,740,231 A | 4/1998 | Cohn et al. |
| 5,745,681 A | 4/1998 | Levine et al. |
| 5,768,348 A | 6/1998 | Solomon et al. ........... 379/67.1 |
| 5,768,521 A | 6/1998 | Dedrick |
| 5,778,367 A | 7/1998 | Wesinger, Jr. et al. |
| 5,794,221 A | 8/1998 | Egendorf |
| 5,802,502 A * | 9/1998 | Gell et al. ..................... 705/37 |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal ........................ 370/389 |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kanai et al. |
| 5,835,896 A | 11/1998 | Fisher et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,890,138 A | 3/1999 | Godin et al. .................. 705/26 |
| 5,893,077 A | 4/1999 | Griffin |
| 5,907,677 A | 5/1999 | Glenn et al. |
| 5,911,132 A | 6/1999 | Sloane |
| 5,914,951 A | 6/1999 | Bentley et al. |
| 5,924,082 A | 7/1999 | Silverman et al. |
| 5,940,471 A | 8/1999 | Homayoun |
| 5,974,141 A | 10/1999 | Saito |
| 5,982,863 A | 11/1999 | Smiley et al. |
| 5,987,118 A * | 11/1999 | Dickerman et al. ..... 379/265.01 |
| 5,987,430 A | 11/1999 | Van Horne et al. |
| 5,991,394 A | 11/1999 | Dezonno et al. |
| 5,999,609 A | 12/1999 | Nishimura |
| 5,999,611 A | 12/1999 | Tatchell et al. |
| 6,011,794 A | 1/2000 | Mordowitz et al. ......... 370/389 |
| 6,014,644 A | 1/2000 | Erickson |
| 6,026,087 A | 2/2000 | Mirashrafi et al. .......... 370/389 |
| 6,026,148 A | 2/2000 | Dworkin et al. |
| 6,026,400 A | 2/2000 | Suzuki |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardener et al. |
| 6,130,933 A | 10/2000 | Miloslavsky ............. 379/90.01 |
| 6,167,449 A | 12/2000 | Arnold et al. |
| 6,175,619 B1 | 1/2001 | DeSimone .................. 379/202 |
| 6,185,194 B1 | 2/2001 | Musk et al. ................. 370/260 |
| 6,188,673 B1 | 2/2001 | Bauer et al. ................. 370/389 |
| 6,188,761 B1 * | 2/2001 | Dickerman et al. ......... 379/265 |
| 6,192,050 B1 | 2/2001 | Stovall ........................ 370/252 |
| 6,223,165 B1 | 4/2001 | Lauffer ........................... 705/8 |
| 6,259,774 B1 | 7/2001 | Miloslavsky ............. 379/90.01 |
| 6,269,336 B1 * | 7/2001 | Ladd et al. .................. 704/270 |
| 6,314,402 B1 * | 11/2001 | Monaco et al. ............. 704/275 |
| 6,385,583 B1 * | 5/2002 | Ladd et al. .................. 704/270 |
| 6,400,806 B1 * | 6/2002 | Uppaluru .................. 379/88.02 |
| 6,430,276 B1 * | 8/2002 | Bouvier et al. ......... 379/121.01 |
| 6,434,527 B1 * | 8/2002 | Horvitz ....................... 704/275 |
| 6,470,317 B1 * | 10/2002 | Ladd et al. .................. 704/275 |
| 6,493,671 B1 * | 12/2002 | Ladd et al. .................. 704/270 |
| 6,493,673 B1 * | 12/2002 | Ladd et al. .................. 704/275 |
| 6,510,417 B1 * | 1/2003 | Woods et al. ............... 704/275 |
| 6,539,359 B1 * | 3/2003 | Ladd et al. .................. 704/275 |
| 6,560,576 B1 * | 5/2003 | Cohen et al. ................ 704/270 |
| 2002/0120554 A1 * | 8/2002 | Vega ........................... 705/37 |
| 2002/0133571 A1 * | 9/2002 | Jacob et al. ................. 709/219 |
| 2003/0043981 A1 * | 3/2003 | Lurie et al. ............. 379/114.25 |

FOREIGN PATENT DOCUMENTS

| | | |
|---|---|---|
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |

OTHER PUBLICATIONS

Aspect Telecomm: Aspect Integrates the Web into the Call Center, M2 Presswire, Aug. 1996.

Information, Bid and Asked, Forbes, Aug. 20, 1990, 92.

Attachmate Ready to Answer Net questions, Network World, Apr. 8, 1996, 37.

US Courts to Launch First Federal 900 Service, Federal Computer Week, Sep. 28, 1992, 8.

Company Devoted to Hot–Line Support, Computer Reseller News, Oct. 21, 1991, 48.

For Telesphere's Clients, Dial '1–900 TUF LUCK',Business Week, Sep. 9, 1991, 88.

When Business Plan and real World Clash, Wall Street Journal, Jun. 9, 1999, B1.

Hidden Cost of Tech Support, PC World, May 1995, 143.

NetBaazar: Networked Electronic Markets for Trading Computation and Information Services, ECDL 1998—Research and Advanced Technology for Digital Libraries, 839.

Multimedia Communication in a Medical Environment, IEEE 1991 Singapore I.C. on Networks, 166.

A New Teleconsultation Terminal System Using ISDN, NTT Review, Jul. 1991, 37.

MiniPay: Charging Per Click on the Web, CNISDN, 1997 v29, 939.

Caring for Customers: Real–time text chat and telephony provide personalized customer support and turn queries into sales leads: Internet World Media, Sep. 1999.

Kiyoshi Kabeya, Akihiro Tomihisa and Sueharu Miyahara, "A New Teleconsultation Terminal System Using ISDN," NTT Review, vol. 3, No. 4, Jul. 1991, pp. 37–43.

Masahiko Hase, Shuji Kawakubo and Mineo Shoman, "Advanced Videophone System Using Synchronized Video Filing Equipment," NTT Review, vol. 3, No. 4 Jul. 1991, pp. 29–36.

Franco Mercalli and Roberto Negrini, "The ESSAI Teleshopping System: An Example of a Broadband Multimedia Application," Publication No. 0–7803–1820–X/94, IEEE, 1994, pp. 572–576.

Abhaya Asthana and Paul Krzyzanowski, "A Small Domain Communications System for Personalized Shopping Assistance," Proceedings of ICPWC'94, Publication No. 0–7803–1996–6/94, IEEE, 1994, pp. 199–203.

Linda Littleton, "Meet the Shadowy Future," Proceedings ACM SIGUCCS User Services Conference XXII, Ypsilanti, Michigan Oct. 16–19, 1994, pp. 205–210.

L. F. Ludwig and D.F. Dunn, "Laboratory for Emulation and Study of Integrated and Coordinated Media Communication," Conference on Office Information Systems, Mar. 23–25, 1988, Sponsored by ACM SIGOIS and IEEECS TC–OA in cooperation with IFIP W.G. 8.4, pp. 283–291.

E.J. Addeo, A.B. Dayao, A.D. Gelman and V.F. Massa, "An Experimental Multi–Media Bridging System," Frontiers in Computer Communications Technology, Computer Communications Review, vol. 17, No. 5, Aug. 11–13, 1987, pp. 236–242.

ISDN Tutorial:Definitions, http://www.ralphb.net/ISDN/defs.html , printed on Apr. 21, 2000.

ISDN Tutorial: Interfaces, http://www.ralphb.net/ISDN/ifaces.html , printed on Apr. 21, 2000.

"USA Global Link Brings Interactively to Internet Shopping", Business Wire., 10/98.

"Lucent Technology and Netscape Team to Deliver Lucent Ecommerce Solutions", Business Wire, 9/98.

"TriNet's, Help Me, I'm Stuck, Internet Voice Button Services Pushes Web Pages to Online Users", Business Wire, 3/98.

Tehrani, Rich, "e–Rip Van Winkle and the 60 second Nap", Call Center Solution, vol. 18, No. 2, pp. 16(3)., 8/99.

"Netcall Internet Call Buttons Enhance E–Commerce Customer Service and Sales", PR Newswire, p. 7431., 8/99.

"Connecting to On–Line Car Shoppers: Auto Sellers Use Netcall Internet Call—Button Technology to Turn Clicks into interactive Sales", Business Wire, p. 4089., 7/99.

Davey, Tom, "Wheeling and Dealing Online", PC Week, vol. 13, No. 45, pp. 1, 129., 11/96.

Collett, Stacey & Julie King, "Why Online Browsers Don't Become Buyers", Computerworld, Vol 33, No 48, p. 14.

Information about Expertcity.com retrieved from the Internet [URL: http://www.expertcity.com] on Nov. 6, 2000.

"Expercity.com Launches Premier Online Marketplace for Expert Services", PR Newswire, 8/99.

Information about keen.com retrieved form the Internet [URL: http://www.keen.com], on Oct. 24, 2000.

Cynthia Hodgson, "Online Expert Databases & Services", Econtent Dec. 1999, pp. 48–53.

Jeff Peline, "Net Firm to Connect Users by Phone", CNET News.com, 'retrieved from http://news.cnet.com on Oct. 24, 2001.

"Keen.Com Launches First Live Answer Community", Press release retrieved from http://www.keen.com on Oct. 24, 2000.

John Healey, From A–Z, "You Can Sell Advice Online", Mercury News 'retrieved from http://wwwO.mercurycenter.com on Oct. 24, 2001.

Joseph Menn, "An Expert? There's Now a Home for You on the Internet", Los Angeles Times 'retrieved from http://www.denverpost.com on Oct. 24, 2001.

"Walker Digital Issued Landmark U.S. patent No. 5,862,223 for Global Internet Marketplace for Experts", Business Wire, Jan. 26, 1999.

Qcircuit Web Site (www.qcircuit.com).

Infomarkets.com Web Site (www.infomarkets.com).

Intellect Exchange Web Site (www.intellectexchange.com).

Answers.com Web Page (www.answers.com).

Chris Ott, "Making Good on the Information Economy", Denver Business Journal, Dec. 17, 1999, p. 27.

Michael Rogers et al, "Experts abound at New Web Sites", Library Journal, Mar. 1, 2000, pp. 22–24.

"Surfbrains.com: Brains online save time & money", M2 Presswire, Jul. 11, 2000.

Michael Kanellos, "Do You Want To Know The Meaning of Life?", Computer Reseller News, Mar. 3, 1997, pp. 72–74.

"Applying Technology News", Accounting Technology, Feb./Mar. 1997, p. 14.

Ellen Greenblatt, "Have you ever wondered . . . ", Datamation, Oct. 1997, p. 126.

"Information for sale: Commercial Digital Reference and AskA Services", Virtual Reference Desk, Sep. 20, 1999, at www.vrd.org/AskA/commAskA.html.

EXP.com Web Site at www.exp.com/.

The Web Site at www.experts–exchange,com/.

Electronic Emissary at www.tapr.org/emissary/.

The Web Site at www.allexperts.com/.

PCT Search Report mailed May 12, 2002 for PCT Application No. US01/48284 (corresponding to U.S. Ser. No. 09/702,217).

* cited by examiner

FIG. 9

APPARATUS AND METHOD FOR SPECIFYING AND OBTAINING SERVICES THROUGH VOICE COMMANDS

FIELD OF THE INVENTION

The invention relates generally to providing users with service providers in a field of service desired by the user. In particular, the invention relates to a method and apparatus for specifying and obtaining services through voice command, via a voice portal, resulting in a live conversation between a user and a selected service provider.

BACKGROUND OF THE INVENTION

Consumers interested in acquiring services must first identify a service provider who is capable of providing the required services. At present, this usually means perusing a telephone directory, which can become frustrating and time-consuming if the service providers telephoned are not immediately available. In addition, a simple telephone call does not enable the service provider to charge a fee according to the time spent with his/her customers.

Systems now exist that enable providers of services to charge fees for the time spent delivering the service. 1-900 phone numbers will charge the seeker of services according to the time spent receiving the service and will transfer this payment, or a portion of it, to the provider.

Each 1-900 number, however, has a very narrow scope—"Hear your Horoscope," for instance. If a seeker would like to hear an entirely different service—"Your Local Weather," for instance—he/she would have to dial a completely different 1-900 number. Similarly, each 1-900 number is quite rigid in the price, quality, and specificity of its service.

However, current systems now exist that enable seekers to locate service providers according to a wide range of price, quality and specificity of service (U.S. application Ser. No. 09/414,710). Such systems also make it possible for the service provider and buyer to be connected and communicate in real time.

Such systems, however, require the service seeker to have a connection to the internet. The service seeker must also have the necessary computer hardware to browse the internet. Presently, there is no system available by which a service seeker can be matched to a wide array of service providers with specific skills using only a simple voice-transmission medium such as the telephone.

Therefore, there remains a need to overcome limitations in the above described existing art which is satisfied by the inventive structure and method described hereinafter.

SUMMARY OF THE INVENTION

The present invention overcomes the problems in the existing art described above by providing a method and apparatus for specifying and obtaining services through voice commands, via a voice portal, resulting in a live conversation between a user and a selected service provider. The present invention is a system through which seekers of a wide array of services can select, contact, converse, and pay for a service provider using a simple voice-transmission medium such as the telephone. The invention enables the seeker to locate a service provider by speaking the name of a profession, such as "psychiatrist," which is recognized by the system's voice-recognition software. In a similar fashion, the seeker can then specify by speaking aloud the price range, quality rating, language, and keyword descriptors of the service provider. Within the desired parameters, the system offers service providers who have made themselves available to render services at the present time. Once the appropriate available service provider is selected, the system connects the service seeker with the service provider for a live conversation. The system automatically bills the seeker for the time spent conversing with the service provider and compensates the service provider accordingly.

Advantages of the invention include providing users with the capability to engage in a live conversation with a selected service provider via a telephone. Contrary to prior systems, requiring an internet connection and browser to receive such services, the equivalent is now provided by a simple voice transmission medium such as the telephone. As a result, virtually anyone can benefit from the capabilities provided by the present invention. The system also allows providers of a field of service to be compensated for supplying their expertise to a user.

BRIEF DESCRIPTION OF THE DRAWINGS

The present invention is illustrated by way of example, and not by way of limitation, in the figures of the accompanying drawings and in which.

DETAILED DESCRIPTION

The present invention overcomes the problems in the existing art described above by providing a method and apparatus for specifying and obtaining services through voice commands resulting in a live conversation between a user and a selected service provider. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form in order to avoid obscuring the details of the present invention.

In the preferred embodiment, the steps of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

System Architecture

Figure 1:
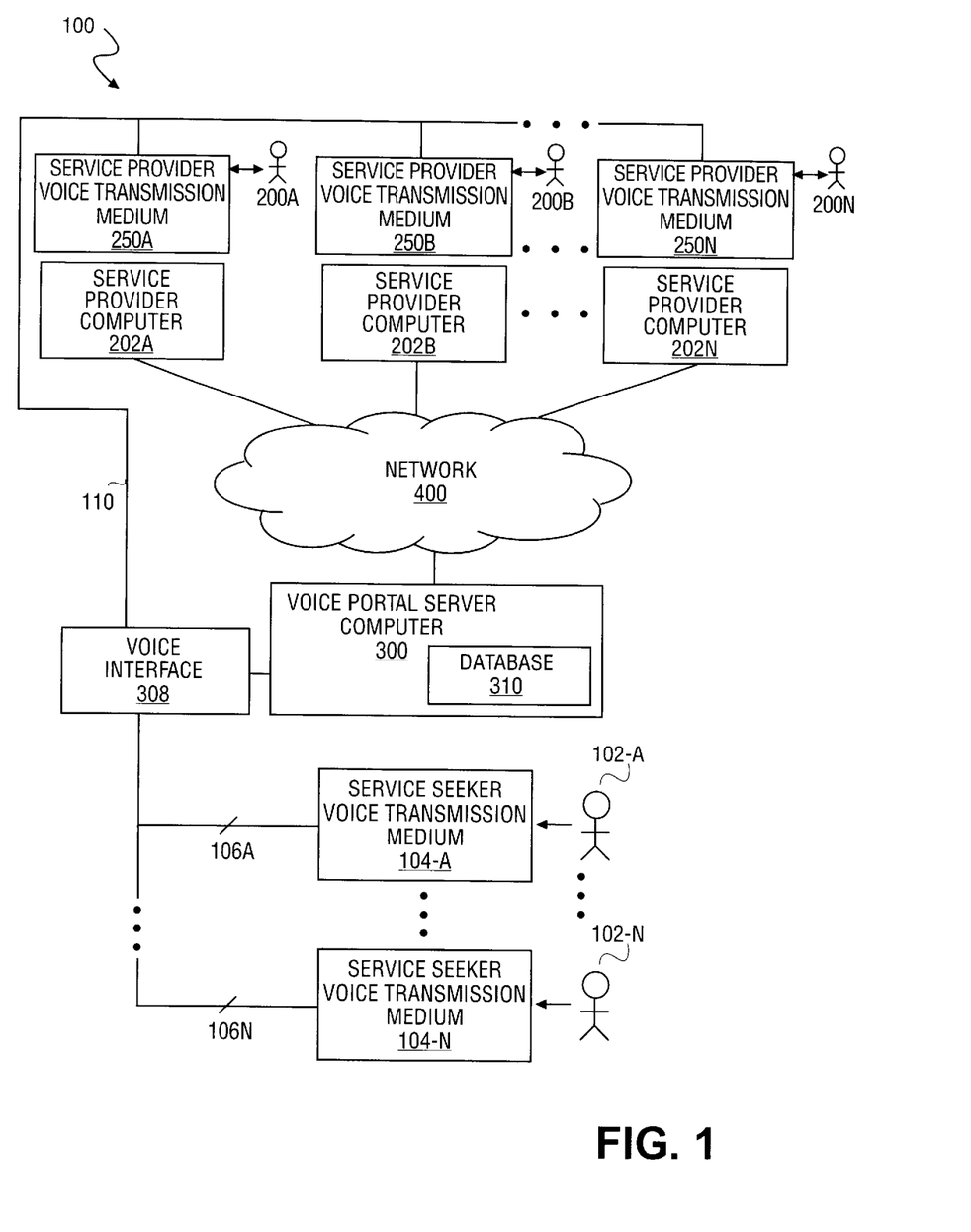
FIG. 1 depicts a block diagram illustrating a system in which a voice portal service provider system in accordance with the present invention may be implemented.

FIG. 1 depicts one embodiment of a voice portal service provider system architecture 100 in which the systems and methods of the present invention may be incorporated. One or more service provider computers 200 (200A, 200B, ..., 200N) are connected through a network 400 (such as an Intranet, a LAN or a WAN such as the Internet) to a host computer or web server ("voice portal server computer") 300. Persons skilled in the art will recognize that the voice portal server computer 300 may include one or more computers working together to provide the controller computer functions described herein. One or more service providers 200 (200A, ..., 200N) each having a voice transmission medium 250 (250A, ..., 250N) that is connected to a communications network 110. One or more users 104 (104A, ..., 104N) each also have a voice transmission medium 104 (104A, ..., 104N) that is connected to the communications network 110. In accordance with the teachings of the present invention, a user 102 (102A, ..., 102N) can send a voice request 106 (106A, ..., 106N) via the voice transmission medium 104, which is received by the voice portal server computer 300 via a voice interface 308. As described in further detail below, the voice portal server computer 300 can then connect the user 102 to a selected service provider 200 for a live conversation via the voice interface 308.

The communications network 110 generally refers to any type of wire or wireless link enabling the transmission of voice data such as, but not limited to, a public switched telephone network, a wireless communications network, a local area network, a wide area network or a combination of networks. The voice transmission mediums 104 and 250 generally refer to any type of device capable of receiving speech from a user and providing the speech to a destination via a communications network, such as the communications network 110. In an embodiment of the present invention, the communications network 110 is a public switched telephone network and the voice transmission medium is a telephone.

Figure 2A:
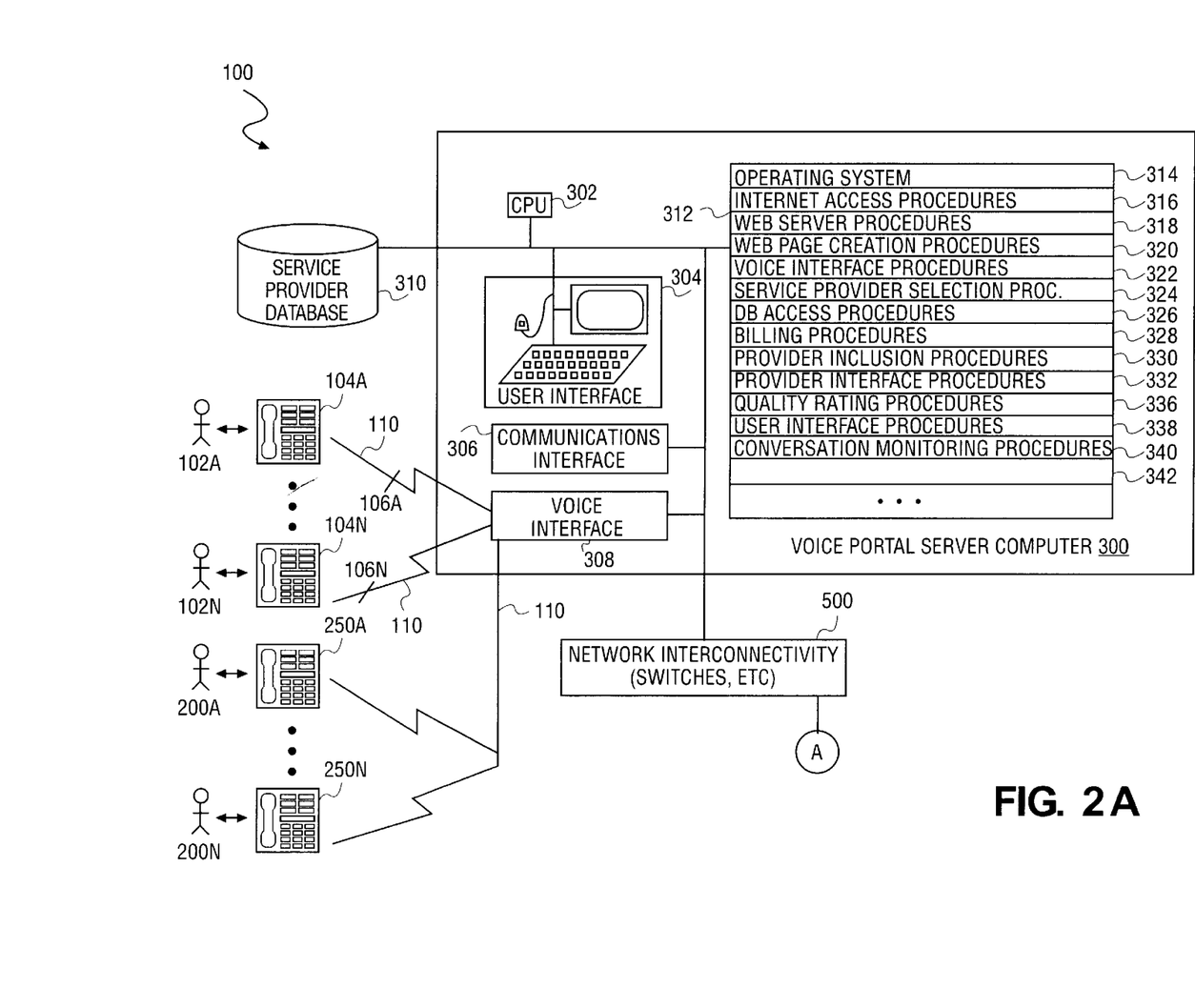
FIGS. 2A and 2B are a block diagrams further illustrating the voice portal service provider system as shown in FIG. 1.
Figure 2B:
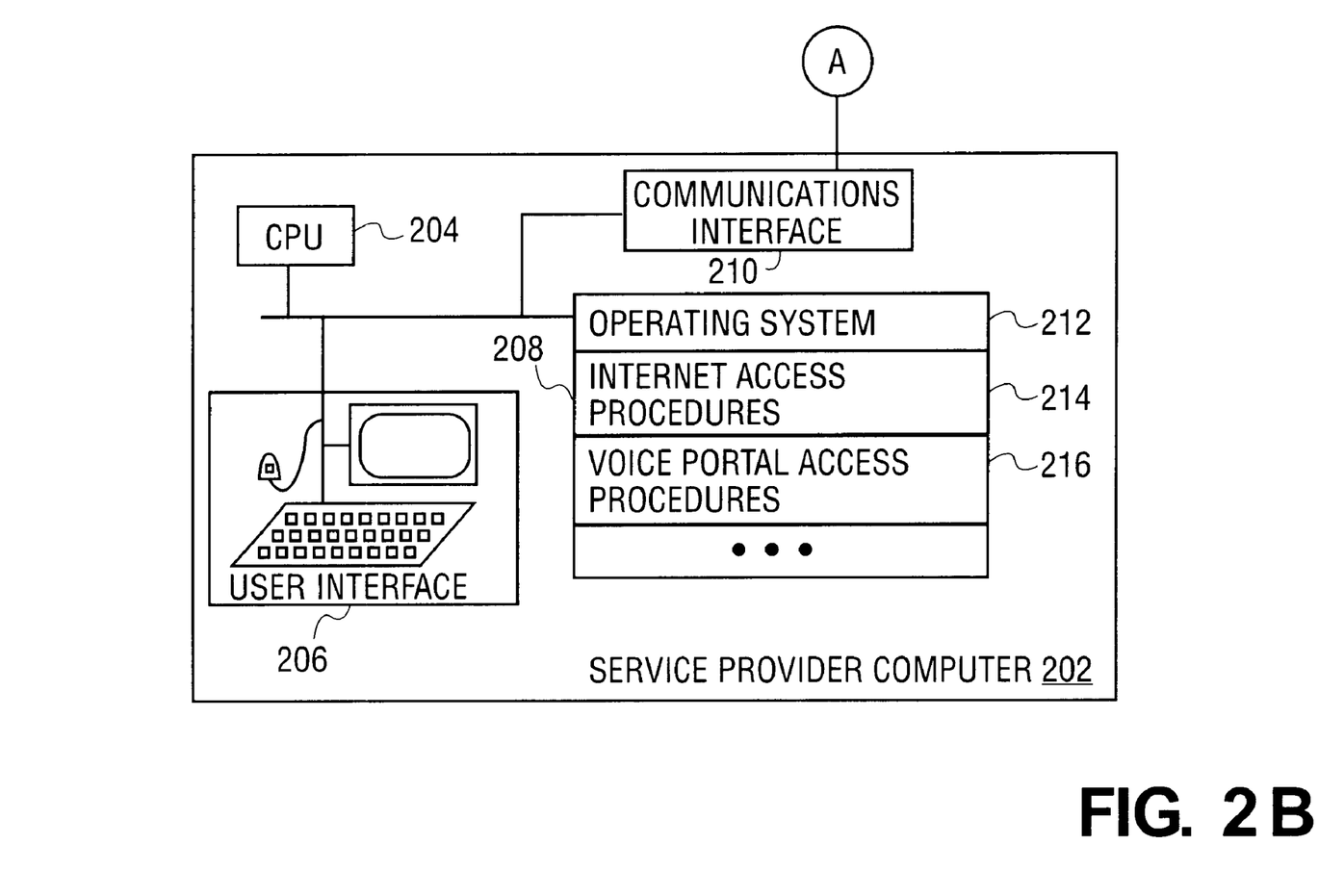

FIGS. 2A and 2B further illustrate the voice portal service provider system 100, including the voice portal server computer 300 (FIG. 2A), as well as the service provider computer 202 (FIG. 2B). As depicted in FIG. 2A, the voice portal server computer 300 includes a central processing unit (CPU) 302, a user interface 304, a communications interface 306, a voice interface 308, a service provider database 310 and a memory 312. The voice portal server computer 300 can be any type of computing device, such as, but not limited to, desktop computers, work stations, lap tops and/or mainframe computers.

The voice interface 308 is used to communicate with users 102 and service providers 200, as well as other system resources not shown. The voice interface 308 receives a voice request 106 provided by user 102 through a voice transmission medium 104, which is provided over the communications network 110. The voice interface 308 provides digitized voice requests to the voice portal server computer 300 for interactive voice recognition, including voice processing, speech recognition and text-to-speech processing.

The memory 312 of the voice portal server computer 300 may be implemented as RAM (random access memory) or a combination of RAM and non-volatile memory, such as one or more magnetic disk storage units. The memory can contain any of the following:

an operating system 314;
internet access procedures 316;
web server procedures 318;
web creation procedures 320;
voice interface procedures 322 for receiving the voice request 106 from the user 102 via the voice interface 308 and connecting the user 102 with the selected service provider 200 for a live conversation;
service provider selection procedures 324 for providing the user 102 with a list of fields of service providers provided by the voice portal system 100, as well as lists of service providers matching a field of service selected by the user 102;
database (DB) access procedures 326 for querying the database 310 in order to return records of service providers matching a field of service selected by the user 102;
billing procedures 328 for billing the user 102 following a live conversation with the service provider 200, as well as compensating the service provider 200 for the live conversation and collecting a premium fee for the voice portal system 100;
provider inclusion procedures 330 for providing an on-line interface to service providers 200 requesting inclusion in the service provider database 310 in order to provide live services via the voice portal system 100 to perspective users 102;
provider interface procedures 332 for providing both an on-line interface, as well as a voice interface, allowing service providers 200 to update information in the service provider database 310, including times of availability;
quality rating procedures 336 for receiving a quality rating for a service provider 200 following a live conversation with a user 102 based on the user's evaluation of the services provided by the service provider 200;

user interface procedures 338 for providing the user 102 with a voice listing of fields of service available from the voice portal system 100, as well as receiving various descriptors for narrowing the search of service providers, including acceptable price ranges, acceptable quality ratings and specific languages;

conversation monitoring procedures 340 for measuring the duration of the live conversation between the user 102 and the service provider 200; and other procedures and files.

Referring now to FIG. 2B, FIG. 2B illustrates the service provider computer 202, which includes a CPU 204, a user interface 206, a memory 210 and a communications interface 208. The communications interface 208 is used to communicate with the voice portal server computer 300, as well as other system resources not shown. The memory 208 of the service provider computer 202 may be implemented as RAM (random access memory) or a combination of RAM and non-volatile memory, such as one or more magnetic disk storage units. The memory 208 can contain the following:

an operating system 212;

internet access procedures 214;

voice portal access procedures 216 for accessing the voice portal server computer 300; and as well as other procedures and files.

Figure 3:
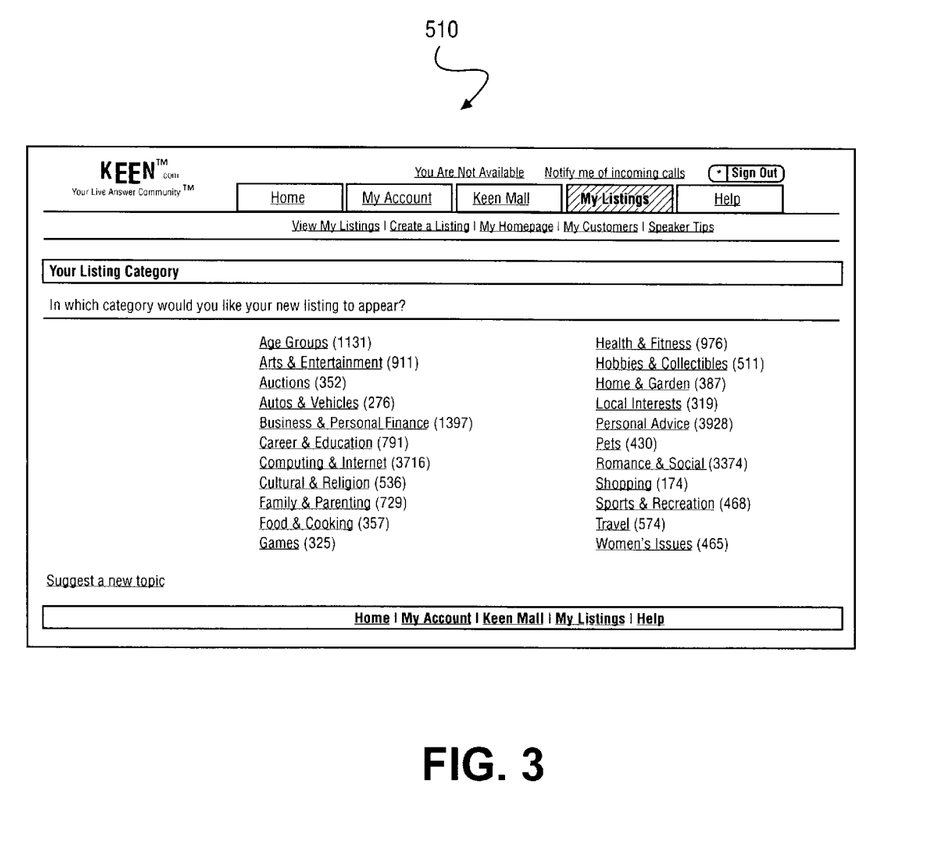
FIG. 3 depicts a web page, including a list of fields of service from which service providers can be selected for live conversations in accordance with a further embodiment of the present invention.
Figure 4:
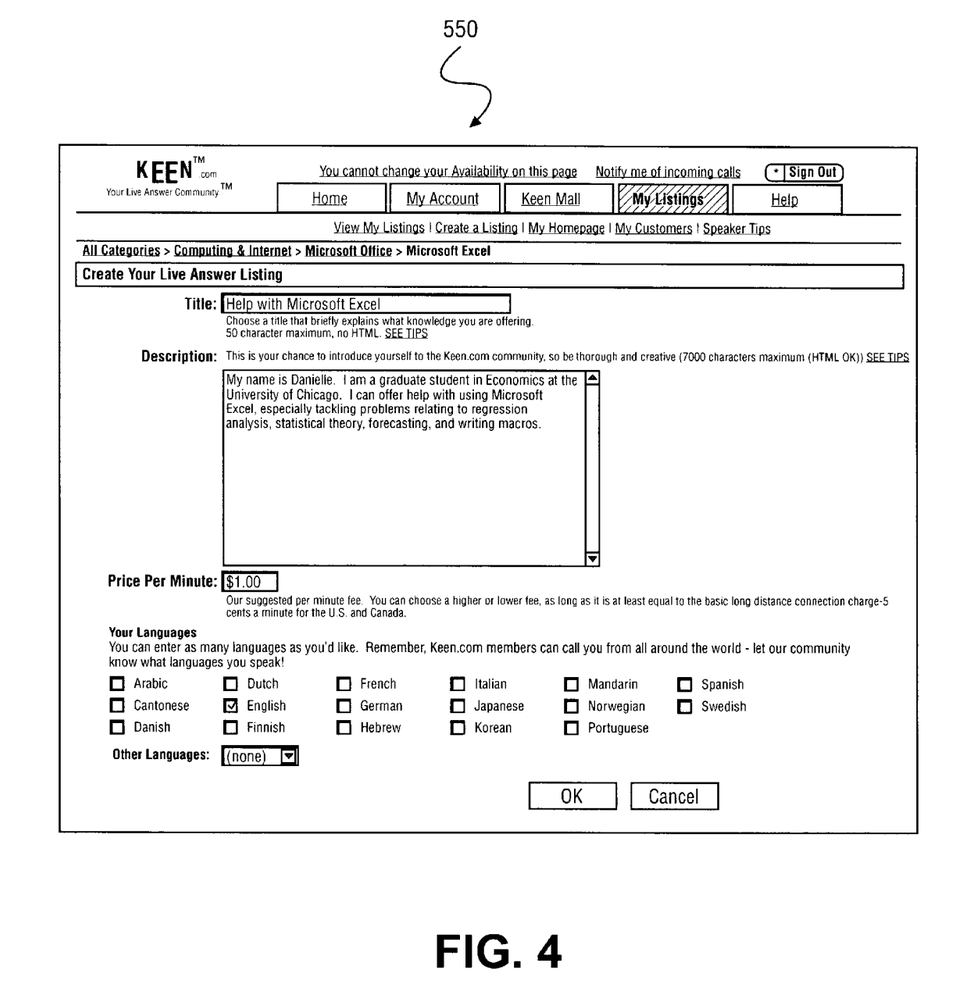
FIG. 4 depicts a web page presented to a service provider desiring inclusion in a service provider database of the present invention.

The embodiment depicted in FIGS. 2A and 2B include a service provider database 310 containing information about a wide array of service providers 200. In order to present themselves to their potential clients, service providers 200 list themselves in this database 310. In one embodiment, this is done through the use of an Internet web site, via web pages 510 and 550, as depicted in FIGS. 3 and 4. The service provider 200 registers his/her name and phone number using the web page 550, along with a description of the service that he/she offers. Possible examples of the wide array of fields of service available from the voice portal system 100 include, but are not limited to, the fields of service depicted in FIG. 3. The description includes key words describing the field of service. The description also includes a price for rendering the service, most commonly, but not restricted to a per-minute price.

The service provider 200 then informs the voice portal system 100 of the times when he/she is available to receive calls. This can be done by creating a schedule of suitable times at the web site 500 or by simply clicking on an "on call" /"off call" switch at the web site 500. Switching service provider 200 availability status can also be done through a voice transmission medium such as a telephone. The service provider 200 calls the central phone number, identifies himself/herself with a password, then presses the telephone keypad "1" or "2", for example, to indicate "on call" or "off call" status, respectively. Once the database 310 contains the phone numbers of service providers, descriptions of their services, their prices, and their real-time availability statuses, the voice portal system 100 can provide services to users 102 desiring corresponding services.

In this embodiment a telephone is used as part of the delivery mechanism or voice transmission medium 250 of the voice portal system 100. A user 102 seeking services dials a central telephone number and then listens to a series of options. The seeker indicates which type of service he would like to receive by speaking the name of a profession, such as "psychiatrist," which is processed by the system's voice interface 308 using voice interface procedures 322. Alternatively, the user 102 can listen to a series of professions and press the numerical keypad to select one. This process continues until the desired field of service is selected.

Once the user 102 has indicated a field of service using the service provider selection procedures 324, the voice portal system 100 searches its database 310 for service providers in that field using the DB access procedures 326. The user 102 can then further narrow down the selection of service providers by speaking keywords, such as "psychiatry—depression." The user 102 can also indicate a known specific service provider by speaking the service provider's name or punching in the service provider's code number into a telephone keypad.

The service provider selection procedures 324 in conjunction with the user interface procedures 338 allow the user 102 to further narrow the search for a service provider 200 by speaking—or pressing into the telephone keypad—a price, such as "50 cents per minute." The voice portal server computer 300 will then narrow the search in the database 310 for service providers 200 that match the price range. The user 102 can further narrow the search for a service provider 200 by speaking—or pressing into the telephone keypad—a quality rating, such as "three stars or higher." The server computer 300 will then narrow the search in the database 340 for service providers 200 which match the quality rating range. Finally, the user 102 can further narrow the search for a service provider by speaking—or pressing into the telephone keypad—the name of a language, such as "Spanish." The server computer 300 will then narrow the search in the database 310 for service providers 200 who can speak this language.

Once a service provider 200 with the desired characteristics has been chosen, the voice portal system 100 will automatically connect the user 102 with the selected service provider 200. Since the service provider 200 has informed the voice portal system 100 that he/she is "on call" and ready to receive calls, the voice portal system 200 can reach him/her with a simple phone call via the voice interface 308. Once both the user 102 and provider 200 are on the phone line 110, the voice portal system 100 conferences the two phone calls together, enabling services to be rendered in a live conversation. The system keeps track of the time spent on the phone call using the conversation monitoring procedures 340. The user 102 is then billed accordingly, and the funds are transferred to the provider 200 using the billing procedures 328.

At the end of the phone call, the system prompts the user 102 to rate the quality of the received service using the quality rating procedures 338. A quality rating of one to five stars, for instance, can be spoken into the telephone 104 or pressed into the telephone keypad. The voice portal system 100 records this rating, and in turn, can store the quality rating in the database 310 and use it as a quality-selection criterion the next time a user 102 calls. Procedural method steps for implementing the teachings of the present invention are now described.

Operation

Figure 5:
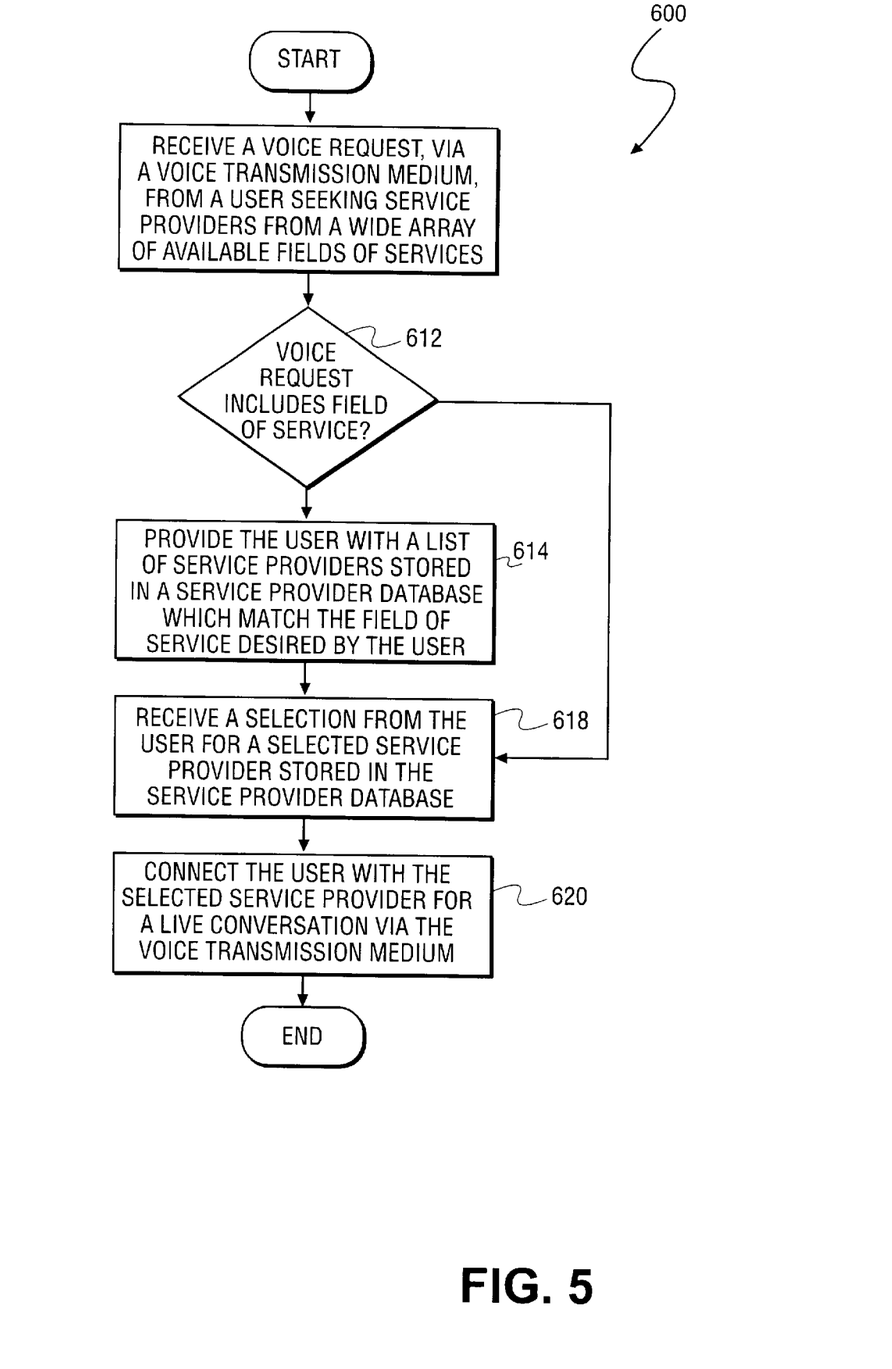
FIG. 5 is a flow chart illustrating steps used to allow a user to select a service provider for a live conversation using the voice portal system in accordance with a further embodiment of the present invention.

Referring now to FIG. 5, a method 600 is depicted for allowing a user 102 to provide a voice request 106 to a voice portal service provider system 100 resulting in a live conversation between a user 102 and a selected service provider 200, for example, in the voice portal system 100 as depicted in FIGS. 1, 2A and 2B. At step 610, a voice request 106 is received by the voice portal service provider system 100 from a user 102 seeking service providers 200 from a wide array of fields of service available from the voice portal system 100. The voice request 106 is provided via a voice transmission medium 104 and received via a voice interface 308 of a voice portal server computer 300.

At step 612, it is determined whether the voice request 106 includes a field of service desired by the user 102. At step 614, when the voice request includes a field of service desired by the user 102, the user 102 is provided with a list of one or more service providers 200 stored in a service provider database 310, which match the field of service desired by the user 102. The voice portal server computer 300 selects the list of service providers for the user 102 using the service provider selection procedures 324, as well as the database access procedures 326. The list of service providers is then presented to the user 102 using the user interface procedures 338.

At step 618, the voice portal server computer 300 receives a selection from the user for a selected service provider 200 stored within the service provider database 310. Finally, at step 620, the voice portal server computer 300 uses the voice interface 308 to connect the user 102 with the selected service provider 200 for a live conversation via the voice transmission mediums 104 and 250. The voice interface procedures 322 handle receipt of the voice request 106 and connection of the user 102 with the selected service provider 200. However, the voice interface procedures 322 may be performed by a human operator.

Figure 6:
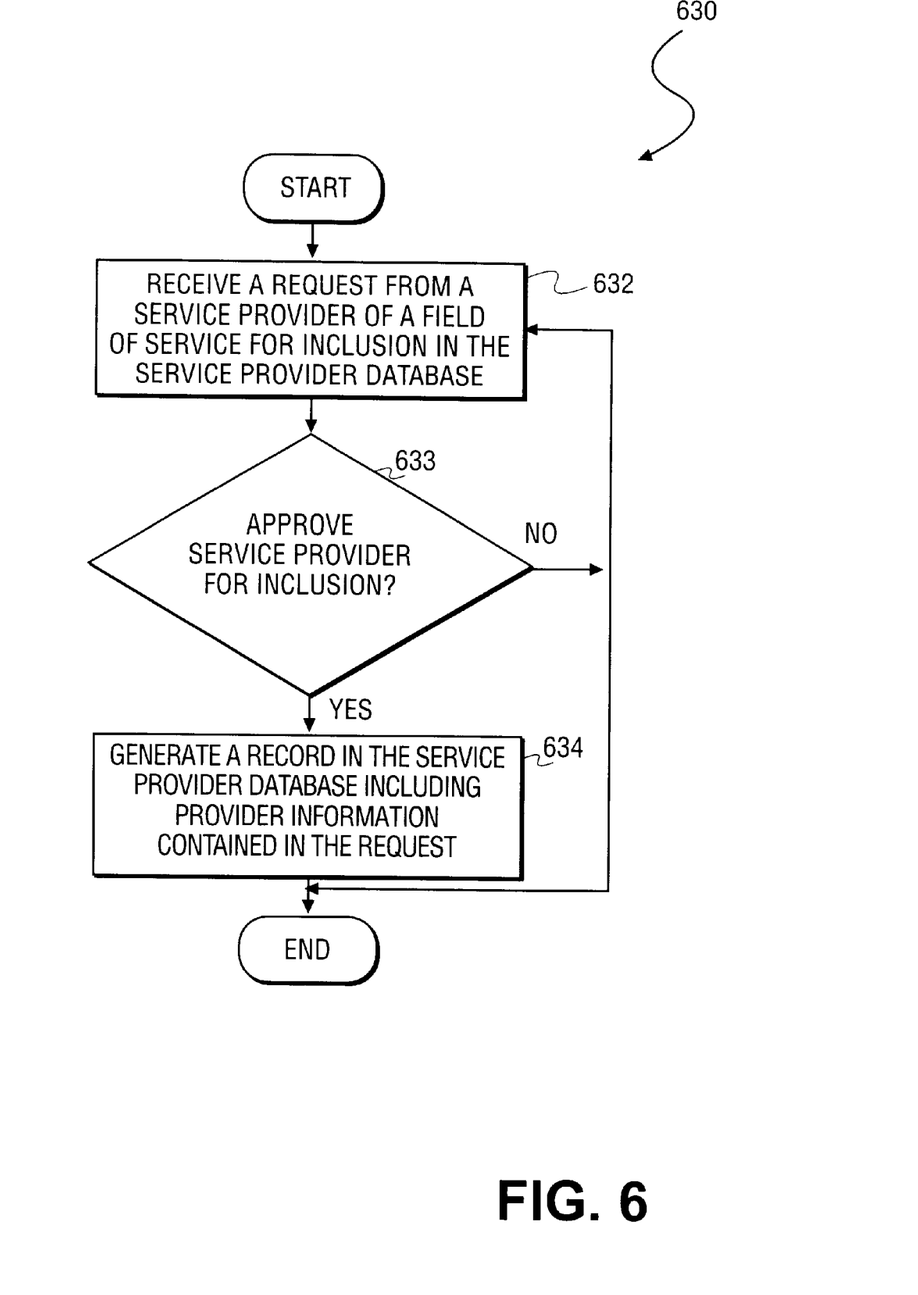
FIG. 6 is a flow chart illustrating steps used by a service provider desiring inclusion in the service provider database in accordance with a further embodiment of the present invention.

FIG. 6 depicts additional method steps 630 for adding service providers 200 to the voice portal system 100. At step 632, the voice portal server computer 300 receives a request from a service provider 200 of a field of service requesting inclusion in the service provider database 310. At step 633, the voice portal service provider system 100 determines whether to approve the service provider 200. Approval of a service provider 200 includes, for example, adding an additional field of service to the voice portal system 100 for a new service provider 200. At step 634, when the service provider 200 is approved, the server computer 300 generates a record in the service provider database 310, including provider information contained in the voice request 106. Acceptance of the provider 200 and generation of provider records in the service provider database 310 is performed by the server computer 300 using provider inclusion procedures 330. The provider information stored in the database 310 can include a service price, real-time service provider availability, specific expertise of the service provider, languages spoken by the provider and a quality rating for the service provider.

Figure 7:
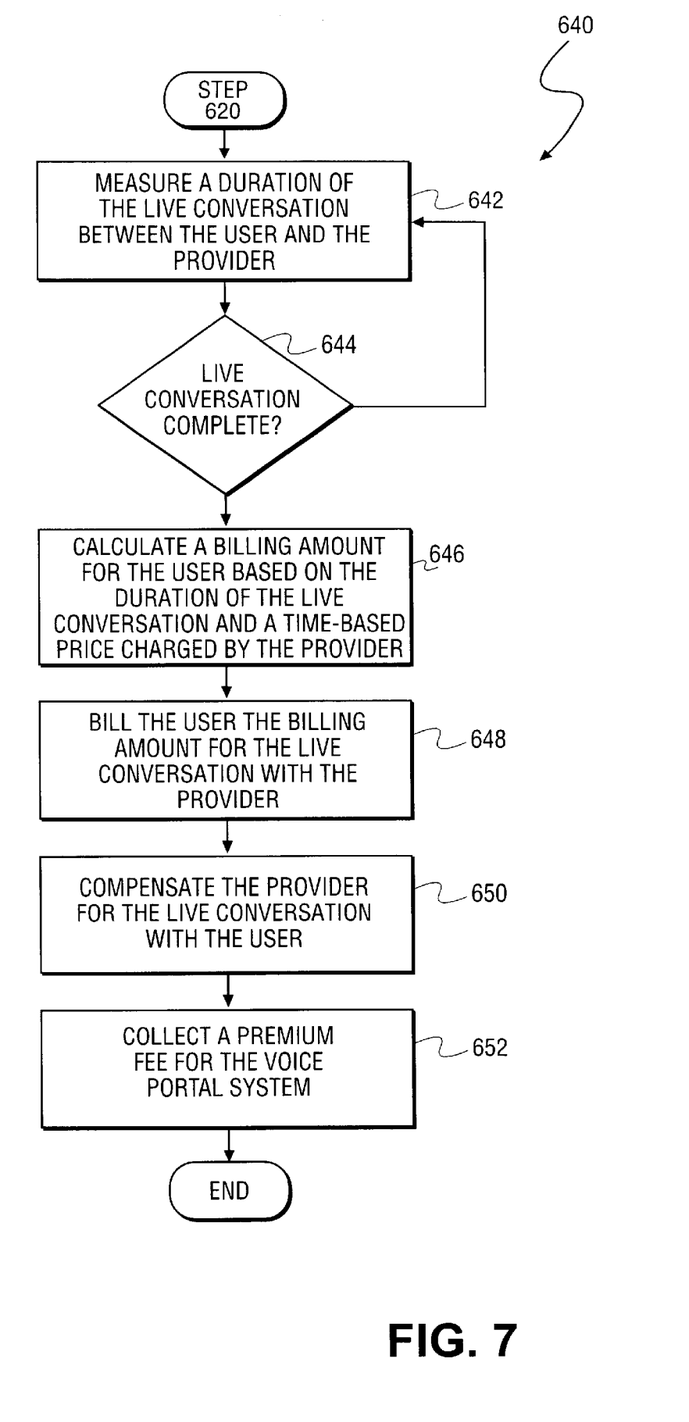
FIG. 7 is a flow chart illustrating steps for billing a user and compensating a service provider following a live conversation in accordance with a further embodiment of the present invention.

FIG. 7 depicts additional method step 640 for billing a user 102 and compensating a service provider 200 for a live conversation between the provider 200 and the user 102. At step 642, the server computer 300 measures a duration of the live conversation between the user 102 and the provider 200 using the conversation monitoring procedures 340. Once the live conversation is complete, the server computer 300 calculates a billing amount for the user 102 based on the duration of the live conversation and a time-based price charged by the service provider 200. The billing amount is generated by the server computer 300 using the billing procedures 328. However, the billing amount may be a flat fee. Otherwise, the server computer 300 continues measuring the duration of the live conversation between the user 102 and service provider 200 at step 642. The time-based price charged by the service provider 200 includes, for example, a per minute price, hourly price or a flat fee.

At step 648, the server computer 300 bills the user 102 the billing amount for the live conversation with the provider 200. Generally, users 102 of the voice portal service provider system 100 will have a billing account set up with the system 100. The voice portal system 100 can then either deduct from the user's account or charge the billing amount, for example, to a credit card submitted by the user 102. At step 650, the voice portal service provider system 100 compensates the provider 200 for the live conversation with the user 102. Finally, at step 652, the server computer 300 collects a premium fee for the voice portal system 100 as a predetermined percentage of the billing amount, for example, ten percent.

Figure 8:
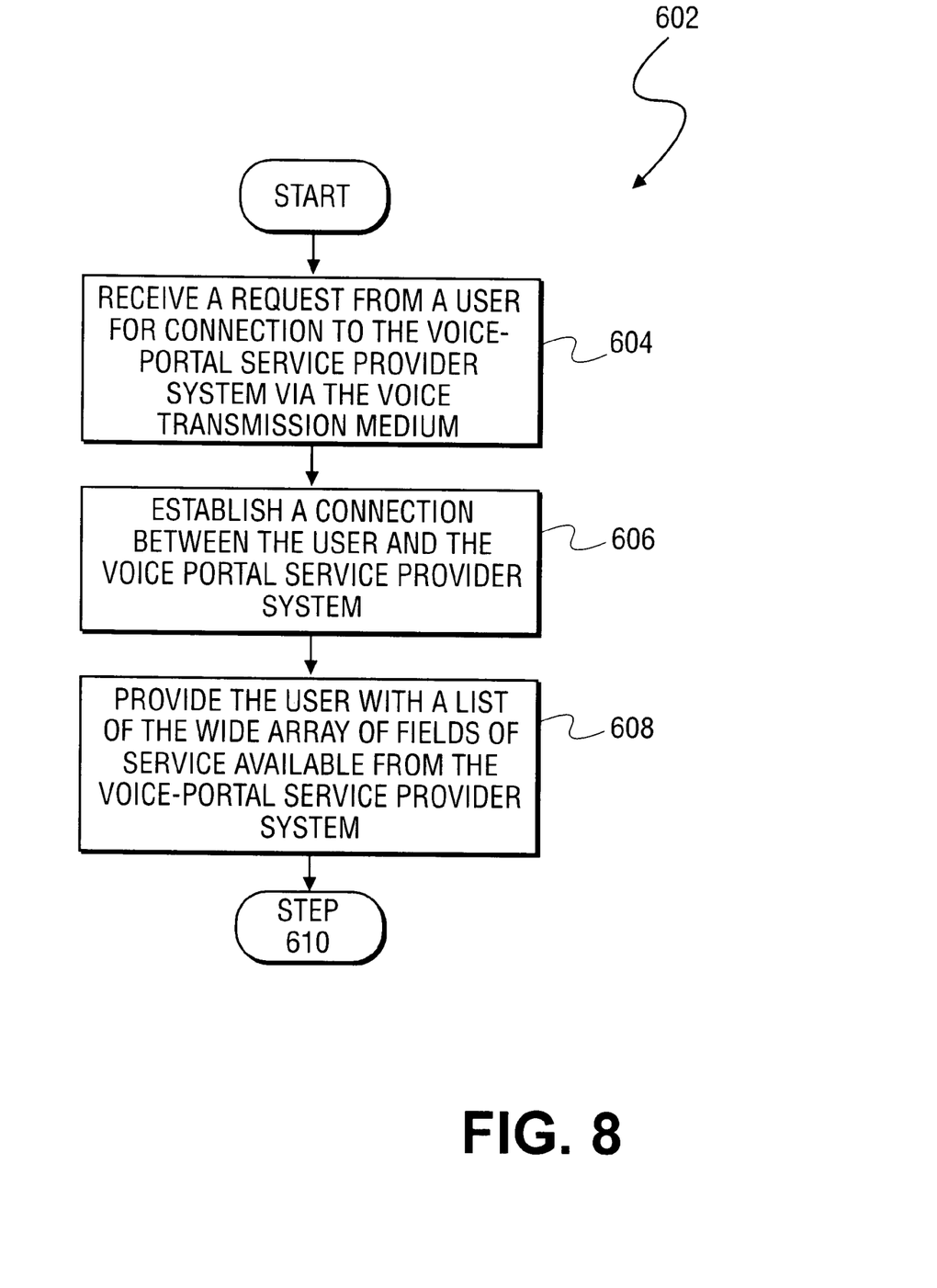
FIG. 8 is a flow chart illustrating steps for connecting a user desiring a service provider to the voice portal service provider system in accordance with an exemplary embodiment of the present invention.

FIG. 8 depicts additional method step 602 for connecting a user 102 to the voice portal service provider system 100. At step 604, the server computer 300 receives a request from a user 102 for connection to the voice portal service provider system 100 via the voice transmission medium 104. The voice transmission medium 104 is, for example, a telephone. At step 606, the server computer 300 establishes a connection between the user and the voice portal system 100 via the voice interface 308. Finally, at step 608, the server computer 300 provides the user 102 with a list of the wide array of fields of service available from the voice portal service provider system 100 using the user interface procedures 338.

Figure 9:
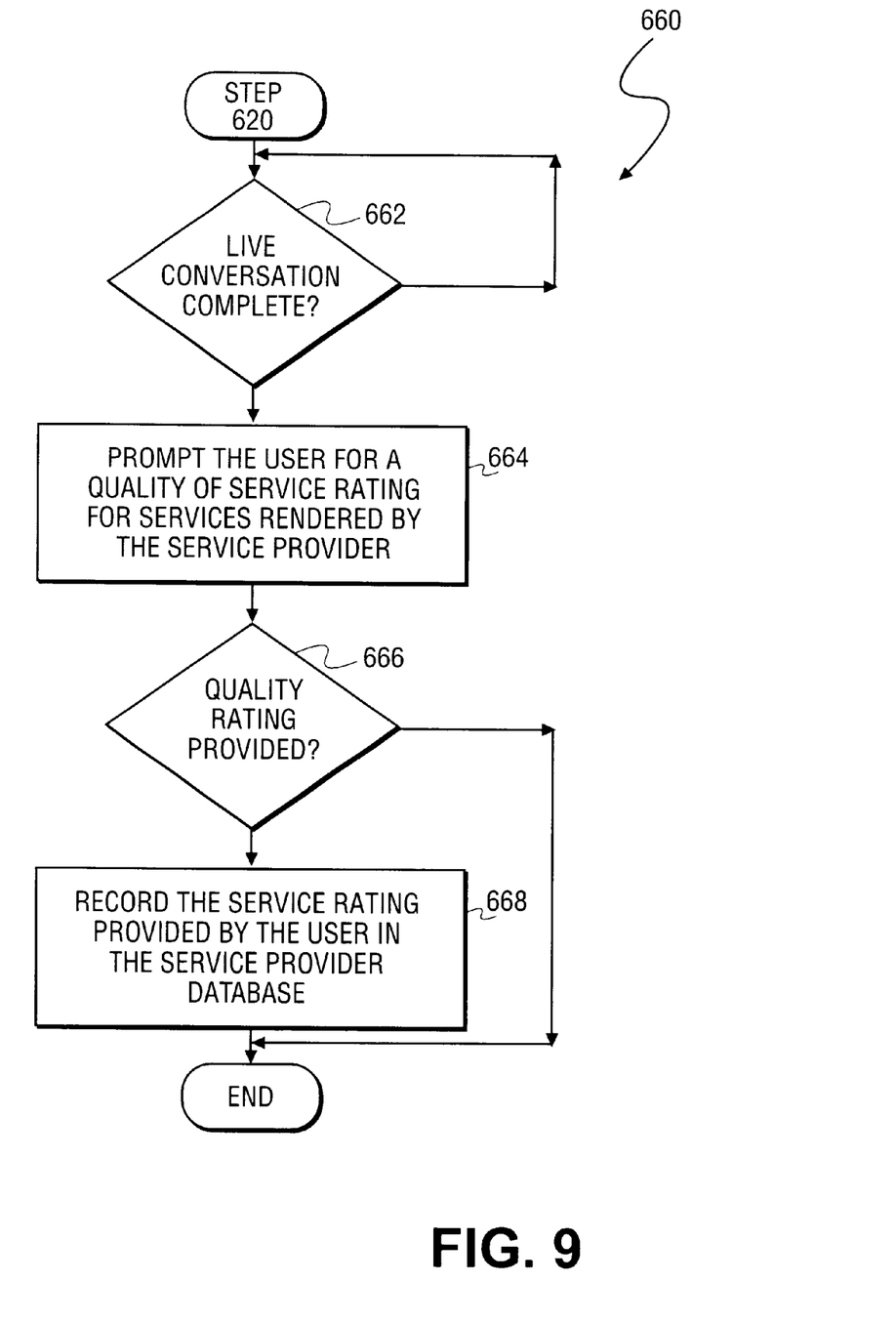
FIG. 9 depicts additional steps for receiving a quality rating from a user regarding services provided by a service provider in accordance with an exemplary embodiment of the present invention.

FIG. 9 depicts additional method step 660 for receiving a quality rating from a user 102 regarding the live conversation with the service provider 200. At step 662, it is determined whether the live conversation is complete. At step 664, the server computer 300 prompts the user 102 for a quality of service rating for services rendered by the service provider 200. At step 666, it is determined whether a quality rating is provided by the user 102. At step 668, the server computer 300 records the service rating provided by the user 102 in the service provider database 310. As described above, the voice request 106 provided by the user 102 can include the category of service providers, a maximum price range for service providers, desired times of availability for service providers, specific expertise of the service provider, a language spoken by the service provider and a minimum quality rating for the service provider. These criteria are used by the server computer 300 and provided to service provider selection procedures 324 in order to narrow the list of service providers 200 for the user 102 to choose from.

Application of the Invention

Danielle, a graduate student in economics, happens to be an expert user of Microsoft Excel. To earn extra money while writing her thesis, Danielle decides to post her Excel-help service son the subject web site, an Internet based implementation of the invention. She registers at the site and lists herself under "Computer Help" and "Excel" at the rate of $1.00 per minute. During the registration process, Danielle provides her telephone number and a description of her abilities, which include regression models and statistical analysis. Whenever Danielle is at home alone studying for long stretches in the evening, she signs on to the subject web site and changes her state of availability to "On Call," or immediately available to receive clients.

Michael is a management consultant building a regression model on Excel for a large clothing retailer. At midnight in thee office, he is having trouble analyzing his spreadsheet. Looking to receive help, he dials the 1-800 number of the subject system. He is prompted by the system to indicate the area of service he desires. He speaks the words, "Computer Help," which are recognized by the system's voice-recognition software. The system has several thousand computer-help service providers to choose from, so Michael specifies his needs by speaking the words, "regression models and analysis." The system has about 50 service providers who are "On Call" to receive customers regarding regression models and analysis. Michael then indicates the price and quality he desires by speaking the words, "one dollar per minute or less" and "with a three-star quality rating or above." The system uses these parameters to fine only those service providers who fit within this price and quality range and can presently receive customers regarding regression models and analysis—there are four. The system relays the descriptions of the four service providers to Michael. He selects Danielle by speaking the words, "Connect Me."

Since Michael has not used the subject phone system before, he first must enter his credit card number to pay for the call. Once the credit card number has been confirmed, the system dials Danielle's phone number, which it has on file from her registration at the web site. When Danielle picks up the phone, the automated voice of the system informs her that there is a client on the line looking for "Computer Help" and willing to pay her $1.00 price per minute. The system asks her whether she would like to accept the call. She speaks the word "yes" (or presses "1" on her telephone keypad), and the system conferences the separate phone calls to Danielle and Michael together so that they can communicate.

Michael and Daniel talk until his problem is solved, which takes eight minutes.

Michael's credit card is billed for eight dollars. He receives a confirming message via electronic mail notifying him of this, along with a request to evaluate Danielle's service, which he does, pressing "5" on his telephone keypad to award her five stars, which the system then averages into her overall quality rating. Danielle's web site account is credited for eight dollars minus a fee collected by the web site. Once Danielle's web site account has accumulated a surplus of $25, she receives a check from the web site in the mail. After receiving many positive reviews from online clients such as Michael, Danielle is inundated with Excel-help requests whenever she goes "On Call," enabling her to raise her rates to $1.50 per minute.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known components and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

Although the present invention has been described with reference to a voice portal service provider system, it is not limited to providing services over the telephone. The present invention can be used for other electronic commerce purposes, other commodities, other types of providers, and other types of services not explicitly listed. In addition, voice transmission mediums within the contemplation of the present invention include systems for wireless communications or any network capable of transmitting voice data. Moreover, performance, by a human operator, of the interactive voice recognition procedures of the present invention is within the contemplation of the present invention.

Advantages of the invention include providing users with the capability to engage in a live conversation with a selected service provider via a telephone. Contrary to prior systems requiring an internet connection and browser to receive such services, the equivalent is now provided by a simple voice transmission medium such as the telephone. As a result, virtually anyone can benefit from the capabilities provided by the present invention. The system also allows providers of a field of service to be compensated for supplying their expertise to a user.

Having disclosed exemplary embodiments, modifications and variations may be made to the disclosed embodiments while remaining within the scope of the invention as defined by the following claims.

What is claimed is:

1. A method comprising:
   receiving a voice request, via a voice-transmission medium, from a user seeking service providers from a wide array of fields of service;
   when the voice request includes a field of service desired by the user, providing the user with a list of one or more service providers stored in a service provider database which match the field of service desired by the user;
   receiving a selection from the user for a selected service provider stored within the service provider database from a field of service desired by the user; and
   connecting the user with the selected service provider for a live conversation via the voice transmission medium regarding the field of service desired by the user.

2. The method of claim 1, further comprising:
   receiving a request from a service provider of a field of service for inclusion in the service provider database; and
   when the service provider is approved for inclusion in the service provider database, generating a record in the service provider database, the record including provider information contained in the request.

3. The method of claim 2, wherein the provider information includes one or more of a service price, real-time service provider availability, specific expertise of the service provider, languages spoken by the service provider and a quality rating for the service provider.

4. The method of claim 1, further comprising:
   billing the user for the live conversation with the selected service provider; and
   compensating the selected service provider for the live conversation with the user.

5. The method of claim 4, wherein the billing the user further comprises:

measuring a duration of the live conversation between the user and the selected service provider; and calculating a billing amount for the user based on the duration of the live conversation and a time-based price charged by the selected service provider.

6. The method of claim 4, wherein the billing the user further comprises:

calculating a billing amount for the user based on a flat fee charged by the service provider.

7. The method of claim 1, wherein the voice request from the user includes one or more of a category of service providers, a service provider price, service provider availability, service provider specific expertise, service provider language and a service provider minimum quality rating.

8. The method of 1, wherein prior to the receiving the voice request, the method further comprises:

receiving a request from a user for connection to a voice-portal service provider system via the voice transmission medium;

establishing a connection between the user and the voice-portal service provider system in order to provide the user with a live connection with a chosen service provider; and providing the user with a list of the wide array of fields of service available from the voice portal service provider system.

9. The method of claim 1, wherein following the connecting the user with the selected service provider, the method further comprises:

once the live conversation between the user and the selected service provider is complete, prompting the user for a quality of service rating for services rendered by the service provider; and recording the service rating provided by the user in the service provider database.

10. A computer readable storage medium including program instruction that directs a computer to function in a specified manner when executed by a processor, the program instructions comprising:

receiving a voice request via a voice-transmission medium from a user seeking service providers from a wide array of fields of service;

when the voice request includes a field of service desired by the user, providing the user with a list of one or more service providers stored in a service provider database which match the field of service desired by the user;

receiving a selection from the user for a selected service provider stored within the service provider database from a field of service desired by the user; and connecting the user with the selected service provider for a live conversation via the voice transmission medium regarding the field of service desired by the user.

11. The computer readable storage medium of claim 10, further comprising:

receiving a request from a service provider of a field of service for inclusion in the service provider database; and when the service provider is approved for inclusion in the in the service provider database, generating a record in the service provider database, the record including provider information contained in the request.

12. The computer readable storage medium of claim 11, wherein the provider information includes one or more of a service price, real-time service provider availability, specific expertise of the service provider, languages spoken by the provider and a quality rating for the service provider.

13. The computer readable storage medium of claim 10, further comprising:

billing the user for the live conversation with the selected provider; and compensating the selected service provider for the live conversation with the user.

14. The computer readable storage medium of claim 13, wherein the instruction for billing the user further comprises:

measuring the duration of the live conversation between the user and the provider; and calculating a billing amount for the user based on the duration of the live conversation and a time-based price charge by the provider.

15. The computer readable storage medium of claim 13, wherein the instruction for billing the user further comprises:

calculating a billing amount for the user based on a flat fee price charge by the provider.

16. The computer readable storage medium of claim 10, wherein the voice request from the user includes one or more of a category of service providers, a service provider price, service provider availability, service provider specific expertise, service provider language and a service provider minimum quality rating.

17. The computer readable storage medium of claim 10, wherein prior to the instruction for receiving the voice request, the apparatus further comprises instructions of:

receiving a request from a user for connection to a service provider system via the voice transmission medium; and establishing a connection between the user and a service provider system in order to provider the user with a live connection with a chosen service provider; and providing the user with a list of the wide array of fields of service available from the voice portal service provider system.

18. The computer readable storage medium of claim 10, wherein following the instruction for connecting the user with the selected service provider, the apparatus further comprises instructions of:

once the live conversation between the user and the selected service provider is complete, prompting the user for a quality of service rating for services rendered by the service provider; and recording the service rating provided by the user in the service provider database.

19. A voice portal service provider system comprises:

a voice transmission medium to connect a user to the system;

a voice recognition engine for receiving a voice request from the user for a service provider stored in a service provider data base from a field of service desired by the user;

a processor to receive a selection from the user for a selected provider from the voice recognition engine, and connect the user with the selected service provider for a live conversation via the voice transmission medium regarding the field of service desired by the user.

20. The system of claim 19, further comprising:

a system interface to provide the user with a list of fields of service providers available, accept a field of service desired by the user, provide the user with a list of one or more service providers stored in a service provider database which match the field of service desired by the user, and a receive a selection from the user for a selected provider.

21. The system of claim 19, further comprising:

a provider interface for receiving a request from a service provider of a field of service for inclusion in the service provider database, and generate a record in the service provider database, the record including provider information contained in the request.

22. The system of claim 21, wherein the provider information includes one or more of a service price, real-time service provider availability, specific expertise of the service provider, languages spoken by the service provider and a quality rating for the service provider.

23. The system of claim 19, wherein voice transmission medium further comprises:

a public switched telephone network interface to connect a user to the system.

24. The system of claim 19, wherein voice transmission medium further comprises:

a wireless communications network interface to connect a user to the system.

* * * * *